United States Patent
Yun et al.

(10) Patent No.: US 11,670,754 B2
(45) Date of Patent: Jun. 6, 2023

(54) POSITIVE ACTIVE MATERIAL FOR RECHARGEABLE LITHIUM BATTERY, PREPARING METHOD THEREOF AND RECHARGEABLE LITHIUM BATTERY COMPRISING POSITIVE ELECTRODE INCLUDING POSITIVE ACTIVE MATERIAL

(71) Applicant: SAMSUNG SDI CO., LTD., Yongin-si (KR)

(72) Inventors: Pilsang Yun, Yongin-si (KR); Jongmin Kim, Yongin-si (KR); Hyunbeom Kim, Yongin-si (KR); Sangin Park, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/102,332

(22) Filed: Nov. 23, 2020

(65) Prior Publication Data

US 2021/0074998 A1    Mar. 11, 2021

Related U.S. Application Data

(63) Continuation-in-part of application No. 16/209,659, filed on Dec. 4, 2018, now Pat. No. 10,847,781.

(30) Foreign Application Priority Data

Dec. 4, 2017    (KR) .................... 10-2017-0165431
Dec. 3, 2018    (KR) .................... 10-2018-0153649

(51) Int. Cl.
*H01M 4/131*    (2010.01)
*C01G 53/00*    (2006.01)
(Continued)

(52) U.S. Cl.
CPC .......... *H01M 4/131* (2013.01); *C01G 53/006* (2013.01); *H01M 4/0471* (2013.01);
(Continued)

(58) Field of Classification Search
CPC .. H01M 4/131; H01M 4/0471; H01M 4/1391; H01M 4/364; H01M 4/505; H01M 4/525
See application file for complete search history.

(56) References Cited

U.S. PATENT DOCUMENTS 6,589,499 B2    7/2003  Gao
10,056,605 B2   8/2018  Oh et al.
(Continued)

FOREIGN PATENT DOCUMENTS

CN    101167209 A    4/2008
CN    101714630 A    5/2010
(Continued)

OTHER PUBLICATIONS

EPO Extended European Search Report dated Jul. 23, 2021, issued in European Patent Application No. 18885458.2 (7 pages).
(Continued)

*Primary Examiner* — Matthew J Merkling
(74) *Attorney, Agent, or Firm* — Lewis Roca Rothgerber Christie LLP

(57) ABSTRACT

A positive active material for a rechargeable lithium battery includes a first positive active material including a secondary particle including at least two agglomerated primary particles, where at least one part of the primary particles has a radial arrangement structure, as well as a second positive active material having a monolith structure, wherein the first and second positive active materials may each include nickel-based positive active materials and the surface of the second positive active material is coated with a boron-containing compound. Further embodiments provide a
(Continued)

method of preparing the positive active material, and a rechargeable lithium battery including a positive electrode including the positive active material.

20 Claims, 4 Drawing Sheets

(51) Int. Cl.
| | |
|---|---|
| *H01M 10/0525* | (2010.01) |
| *H01M 4/04* | (2006.01) |
| *H01M 4/1391* | (2010.01) |
| *H01M 4/36* | (2006.01) |
| *H01M 4/525* | (2010.01) |
| *H01M 4/505* | (2010.01) |
| *H01M 4/02* | (2006.01) |

(52) U.S. Cl.
CPC ......... *H01M 4/1391* (2013.01); *H01M 4/364* (2013.01); *H01M 4/505* (2013.01); *H01M 4/525* (2013.01); *H01M 10/0525* (2013.01); *C01P 2004/50* (2013.01); *C01P 2004/61* (2013.01); *C01P 2004/62* (2013.01); *C01P 2006/12* (2013.01); *H01M 2004/028* (2013.01)

(56) References Cited

U.S. PATENT DOCUMENTS

| | | | |
|---|---|---|---|
| 2004/0058243 A1 | 3/2004 | Ohzuku et al. | |
| 2007/0122705 A1 | 5/2007 | Paulsen et al. | |
| 2008/0026292 A1 | 1/2008 | Paulsen et al. | |
| 2008/0248391 A1 | 10/2008 | Wakasugi et al. | |
| 2009/0029253 A1 | 1/2009 | Itou et al. | |
| 2009/0258296 A1 | 10/2009 | Kawasato et al. | |
| 2010/0081055 A1 | 4/2010 | Konishi et al. | |
| 2011/0079752 A1 | 4/2011 | Park et al. | |
| 2011/0226986 A1 | 9/2011 | Wang et al. | |
| 2011/0240913 A1 | 10/2011 | Kim et al. | |
| 2012/0085967 A1 | 4/2012 | Yokoyama et al. | |
| 2012/0100429 A1 | 4/2012 | Sueki et al. | |
| 2012/0261610 A1 | 10/2012 | Paulsen et al. | |
| 2013/0316237 A1* | 11/2013 | Miki ................. | H01M 4/366 |
| | | | 429/218.1 |
| 2014/0106212 A1 | 4/2014 | Choi et al. | |
| 2014/0131633 A1 | 5/2014 | Ito et al. | |
| 2014/0205906 A1 | 7/2014 | Kudo et al. | |
| 2014/0212759 A1 | 7/2014 | Blangero et al. | |
| 2015/0010819 A1 | 1/2015 | Lee et al. | |
| 2015/0064577 A1 | 3/2015 | Natsui et al. | |
| 2015/0093580 A1 | 4/2015 | Kobayashi et al. | |
| 2015/0228971 A1 | 8/2015 | Kim et al. | |
| 2015/0340686 A1 | 11/2015 | Sun et al. | |
| 2016/0156020 A1 | 6/2016 | Tokoro et al. | |
| 2016/0301069 A1 | 10/2016 | Kwak et al. | |
| 2016/0380263 A1 | 12/2016 | Nakayama et al. | |
| 2017/0222211 A1 | 8/2017 | Ryu et al. | |
| 2017/0222225 A1 | 8/2017 | Kang et al. | |
| 2017/0309910 A1 | 10/2017 | Jo et al. | |
| 2017/0317342 A1 | 11/2017 | Kang et al. | |
| 2017/0358799 A1 | 12/2017 | Gunji et al. | |
| 2018/0026268 A1 | 1/2018 | Kim et al. | |
| 2018/0048015 A1 | 2/2018 | Lee et al. | |
| 2018/0108940 A1 | 4/2018 | Kwon et al. | |
| 2018/0151876 A1 | 5/2018 | Kim et al. | |
| 2018/0248180 A1* | 8/2018 | Liu ................. | H01M 4/525 |
| 2018/0261842 A1 | 9/2018 | Park et al. | |
| 2018/0316005 A1 | 11/2018 | Shin et al. | |
| 2019/0020024 A1 | 1/2019 | Wang et al. | |
| 2019/0044127 A1 | 2/2019 | Kim | |
| 2019/0173076 A1* | 6/2019 | Kim ................. | C01G 53/006 |
| 2019/0355981 A1 | 11/2019 | Chang et al. | |
| 2020/0127276 A1 | 4/2020 | Kim et al. | |
| 2020/0185714 A1 | 6/2020 | Han et al. | |
| 2020/0295368 A1 | 9/2020 | Kong et al. | |
| 2022/0029147 A1 | 1/2022 | Ogawa et al. | |
| 2022/0059836 A1 | 2/2022 | Hiratsuka et al. | |

FOREIGN PATENT DOCUMENTS

| | | |
|---|---|---|
| CN | 107251282 A | 10/2017 |
| EP | 1876664 A1 | 1/2008 |
| EP | 2169745 A1 | 3/2010 |
| EP | 3425703 B1 | 9/2019 |
| EP | 3647269 A1 | 5/2020 |
| JP | 2001-167761 A | 6/2001 |
| JP | 2013-038022 A | 2/2013 |
| JP | 2013-120676 A | 6/2013 |
| JP | 2015-076397 A | 4/2015 |
| JP | 2016-76294 A | 5/2016 |
| JP | 2018-92931 A | 6/2018 |
| JP | 2018-532236 A | 11/2018 |
| JP | 6544951 B2 | 7/2019 |
| KR | 2003-0045853 A | 6/2003 |
| KR | 10-2006-0105039 A | 10/2006 |
| KR | 10-2009-0032138 A | 3/2009 |
| KR | 10-2010-0130522 A | 12/2010 |
| KR | 10-2011-0109879 A | 10/2011 |
| KR | 10-1154880 B1 | 6/2012 |
| KR | 10-1244050 B1 | 3/2013 |
| KR | 10-2014-0025597 A | 3/2014 |
| KR | 10-1452950 B1 | 10/2014 |
| KR | 10-1593401 B1 | 2/2016 |
| KR | 10-1595322 B1 | 2/2016 |
| KR | 10-1604509 B1 | 3/2016 |
| KR | 10-2016-0049519 A | 5/2016 |
| KR | 10-2016-0129764 A | 11/2016 |
| KR | 10-2017-0063408 A | 6/2017 |
| KR | 10-2017-0093085 A | 8/2017 |
| KR | 10-1785262 B1 | 10/2017 |
| KR | 10-2018-0059736 A | 6/2018 |
| KR | 10-2018-0121267 A | 11/2018 |
| KR | 10-2019-0006906 A | 1/2019 |
| KR | 10-2019-0065963 A | 6/2019 |
| KR | 10-1989399 B1 | 6/2019 |
| KR | 10-2020-0043612 A | 4/2020 |
| KR | 10-2020-0070649 A | 6/2020 |
| KR | 10-2144056 B1 | 8/2020 |
| KR | 10-2020-0110027 A | 9/2020 |
| KR | 10-2175126 B1 | 11/2020 |
| WO | WO 2015/053580 A1 | 4/2015 |
| WO | WO 2016/129629 A1 | 8/2016 |
| WO | 2020/137296 A1 | 7/2020 |

OTHER PUBLICATIONS

Kim, Yongseon et al., "First-principles and experimental investigation of the morphology of layer-structured $LiNiO_2$ and $LiCoO_2$", *Journal of Materials Chemistry*, 2012, vol. 22, pp. 12874-12881.
Duan, Jianguo et al., "Enhanced compacting density and cycling performance of Ni-riched electrode via building mono dispersed micron scaled morphology", *Journal of Alloys and Compounds*, vol. 695 (2017) pp. 91-99.
International Search Report and Written Opinion for patent application No. PCT/KR2018/015220, dated May 24, 2019, 10 pages.
Sun, Yang-Kook, et al., "Synthesis and Characterization of Li[(Ni0.8Co0.1 Mn0.1)0.8(Ni0.5Mn0.5)0.2]O2 with the Microscale Core-Shell Structure as the Positive Electrode Material for Lithium Batteries," J. Am. Chem. Soc., vol. 127, 2005, 8 pages.
Korean Office Action dated May 21, 2020, for corresponding Korean Patent Application No. 10-2018-0153649 (6 pages).
Korean Intellectual Property Office Notice of Allowance for corresponding Korean Patent Application No. 10-2018-0153649, dated Sep. 22, 2020, 5 pages.
Chinese Office Action, with English translation, dated Nov. 19, 2021, issued in corresponding Chinese Patent Application No. 201880077888.5 (22 pages).
U.S. Notice of Allowance dated Dec. 8, 2021, issued in U.S. Appl. No. 17/102,412 (10 pages).

(56) References Cited

OTHER PUBLICATIONS

U.S. Notice of Allowance from U.S. Appl. No. 16/209,659, dated Jul. 17, 2020, 8 pages.
U.S. Restriction Requirement from U.S. Appl. No. 16/209,659, dated Mar. 27, 2020, 5 pages.
U.S. Office Action dated Oct. 20, 2021, issued in U.S. Appl. No. 17/073,124 (7 pages).
EPO Extended European Search Report dated Oct. 15, 2021, issued in European Patent Application No. 21170242.8 (10 pages).
Korean Office Action from Application No. 10-2020-0124255, dated Feb. 23, 2022, 7 pages.
U.S. Notice of Allowance from U.S. Appl. No. 17/073,124, dated Feb. 8, 2022, 8 pages.
Notice of Allowance for U.S. Appl. No. 17/073,124 dated Apr. 8, 2022, 5 pages.
European Search Report for EP Application No. 21206169.1 dated Apr. 8, 2022, 9 pages.
Notice of Allowance for related U.S. Appl. No. 17/102,412, dated Mar. 24, 2022 (5 pages).
Notice of Allowance for U.S. Appl. No. 17/102,412 dated Jul. 13, 2022, 5 pages.
Notice of Allowance for U.S. Appl. No. 17/073,124 dated Aug. 5, 2022, 5 pages.
U.S. Restriction Requirement dated Sep. 23, 2022, issued in U.S. Appl. No. 17/186,502 (6 pages).
EPO Extended European Search Report dated Jan. 3, 2023, issued in European Patent Application No. 22189038.7 (9 pages).
U.S. Office Action dated Nov. 29, 2022, issued in U.S. Appl. No. 17/186,502 (10 pages).
Japanese Office Action dated Dec. 5, 2022, issued in Japanese Patent Application No. 2021-184817 (6 pages).
U.S. Notice of Allowance dated Feb. 1, 2023, issued in U.S. Appl. No. 17/073,124 (5 pages).
U.S. Notice of Allowance dated Mar. 22, 2023, issued in U.S. Appl. No. 17/186,502 (9 pages).

* cited by examiner

POSITIVE ACTIVE MATERIAL FOR RECHARGEABLE LITHIUM BATTERY, PREPARING METHOD THEREOF AND RECHARGEABLE LITHIUM BATTERY COMPRISING POSITIVE ELECTRODE INCLUDING POSITIVE ACTIVE MATERIAL

CROSS-REFERENCE TO RELATED APPLICATION

The current application is a continuation-in-part of U.S. patent application Ser. No. 16/209,659, filed in the United States Patent and Trademark Office on Dec. 4, 2018, which claims priority to and the benefit of Korean Patent Application No. 10-2017-0165431, filed in the Korean Intellectual Property Office on Dec. 4, 2017, and Korean Patent Application No. 10-2018-0153649 filed in the Korean Intellectual Property Office on Dec. 3, 2018, the entire content of each of which is incorporated herein by reference.

BACKGROUND

1. Field

One or more aspects of example embodiments of the present disclosure are related to a positive active material for a rechargeable lithium battery, a preparing method thereof, and a rechargeable lithium battery including a positive electrode including the same.

2. Description of the Related Art

As portable electronic devices, communication devices, and/or the like are developed, there is a need for development of a rechargeable lithium battery having a high energy density.

A positive active material for a rechargeable lithium battery may be a lithium nickel manganese cobalt composite oxide, a lithium cobalt oxide, and/or the like. When such positive active materials are used, the cycle-life of a rechargeable lithium battery may be decreased, resistance may be increased, and capacity characteristics may be insufficient due to cracks generated in the positive active material as charging and discharging are repeated.

SUMMARY

One or more aspects of example embodiments of the present disclosure are directed toward a positive active material for a rechargeable lithium battery that exhibits less (reduced) structure collapse and cracking (which may be caused by repeated charging and discharging), as well as fewer side reactions with an electrolyte; as well as a preparing method thereof, and a rechargeable lithium battery having high capacity and/or improved capacity retention and cycle-life characteristics.

One or more example embodiments of the present disclosure provide a positive active material for a rechargeable lithium battery including a first positive active material including a secondary particle including at least two agglomerated primary particles, where at least one part of the primary particles (e.g., at least one part or all part(s) of each of the primary particles) has a radial arrangement structure; and a second positive active material having a monolith structure, wherein the first positive active material and the second positive active material each include a nickel-based positive active material, and the surface of the second positive active material is coated with a boron-containing compound.

One or more example embodiments of the present disclosure provide a method of preparing a positive active material for a rechargeable lithium battery that includes: subjecting a first precursor to a first heat-treatment in a first oxidizing gas atmosphere to obtain a first nickel-based oxide, subjecting a second precursor to a second heat-treatment in a second oxidizing gas atmosphere to obtain a second nickel-based oxide having a monolith structure, mixing the second nickel-based oxide and a boron-containing precursor and heat-treating the mixture to obtain a second nickel-based oxide coated with a boron-containing compound, and mixing the first nickel-based oxide and the second nickel-based oxide coated with the boron-containing compound to obtain a positive active material including a first positive active material and a second positive active material having a monolith structure and coated with the boron-containing compound.

One or more example embodiments of the present disclosure provide a rechargeable lithium battery including a positive electrode including the positive active material for a rechargeable lithium battery, a negative electrode, and an electrolyte between the positive electrode and the negative electrode.

One or more example embodiments of the present disclosure may provide a positive active material for a rechargeable lithium battery that may exhibit less (reduced) structure collapse and cracking that may be caused by repeated charging and discharging, and fewer side reactions with an electrolyte. In addition, by providing a material having a monolithic structure that does not have a capacity reduction, a rechargeable lithium battery including the same has a high capacity and excellent capacity retention and cycle-life characteristics.

DETAILED DESCRIPTION

Figure 1:
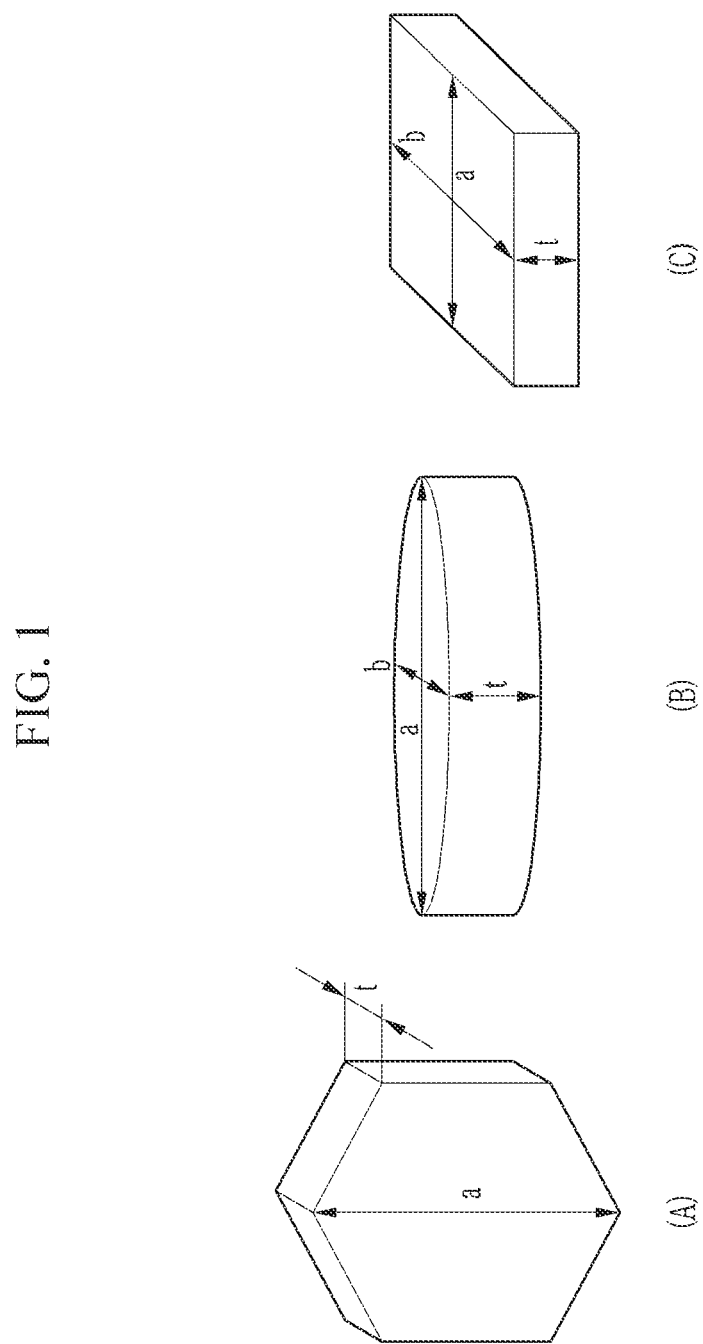
FIG. 1 is a schematic view showing shapes of the primary particles according to embodiments of the present disclosure.

The present disclosure will be described more fully hereinafter with reference to the accompanying drawings, in which example embodiments of the present disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification, and duplicative descriptions thereof may not be provided.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present. Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

The sizes, particle diameters, or lengths of various particles may be represented by a single measurement to show an average size of a group of particles. Generally used methods of reporting particle sizes include a mode diameter showing the maximum value of the particle size distribution (e.g., most common particle size within the distribution), a median diameter corresponding to the integral center value of the particle size distribution curve, one or more average diameters (e.g., numeral average, length average, area average, mass average, volume average, etc.), and/or the like. Unless otherwise specified, the average sizes, average particle diameters, or average lengths as reported in this disclosure refer to volume average sizes, volume average diameters, or volume average lengths, or may be obtained by measuring D50 (the particle diameter at the 50th percentile of the particle size distribution). In some embodiments, the values may be measured through a particle size analyzer that analyzes the size of particles by utilizing diffraction, or may be measured from a scanning electron microscope photograph.

The term "monolith structure" refers to a structure in which a morphology of each particle is separated and/or dispersed in independent phases separated from each other.

Hereinafter, referring to FIGS. 1 to 3, a positive active material for a rechargeable lithium battery according to embodiments of the present disclosure is described.

A positive active material for a rechargeable lithium battery according to embodiments of the present disclosure includes a first positive active material including a secondary particle including at least two agglomerated primary particles, and a second positive active material having a monolith structure. At least one part of the secondary particle may have a radial arrangement structure, and the first positive active material and the second positive active material each include a nickel-based positive active material. The surface of the second positive active material may be coated with a boron-containing compound.

Hereinafter, the first positive active material according to embodiments of the present disclosure is described.

The first positive active material may include a secondary particle including at least two agglomerated primary particles. At least one part of the primary particles (e.g., at least one part or all part(s) of each of the primary particles) may have a plate shape.

FIG. 1 is a schematic view showing one or more suitable plate shapes of the primary particles according to embodiments of the present disclosure. Referring to FIG. 1, a plate-shaped primary particle according to embodiments of the present disclosure may have any suitable shape, such as (A) a polygonal nanoplate shape (such as hexagon and/or the like), (B) a nanodisk shape, and/or (C) a rectangular parallelepiped shape, each having a basic plate-shaped structure.

In FIG. 1, "a" refers to a length of the major axis of the plate-shaped primary particle, "b" refers to a length of the minor axis, and "t" refers to a thickness thereof. Herein, the length a of the major axis may refer to a maximum (largest) length based on the widest surface of the plate-shaped primary particle, and the length b of the minor axis may refer to a minimum length on the widest surface of the plate-shaped primary particle. In the plate-shaped primary particle, a direction containing the thickness t may be referred to as a thickness direction, and a direction containing the length a of the major axis and the length b of the minor axis may be referred to as a plane direction. The thickness t of the plate-shaped primary particle may be smaller than the length a of the major axis and the length b of the minor axis, which are lengths in the plane direction. The length a of the major axis among the lengths in the plane direction may be longer than or equal to the length b of the minor axis.

The first positive active material according to embodiments of the present disclosure may have irregular pores (an irregular porous structure) in the internal part and/or in the external part of the secondary particle. The term "irregular porous structure" may refer to a structure in which the pore sizes and shapes are not regular and do not have uniformity (e.g., are not uniform). Here, the term "pore size" may refer to the average diameter or length of the inside of the pore. The internal part of the irregular porous structure may include primary particles similar or substantially identical to those in the external part thereof. The primary particles in the internal part of the secondary particle may be arranged without regularity, unlike the primary particles in the external part.

The term "external part" may refer to a region (e.g., of the particle) within about 30 length % to about 50 length % from the outermost surface, for example, within about 40 length % from the outermost surface with respect to the distance from the center to the surface of the secondary particle, or in some embodiments, may refer to a region within about 2 μm from the outermost surface of the secondary particle. The term "internal part" may refer to a region (e.g., of the particle) within about 50 length % to about 70 length % from the center, for example, within about 60 length % from the center with respect to the distance from the center to the surface of the secondary particle, or in some embodiments, a region excluding the region within about 2 μm, about 4 μm, or about 6 μm from the outermost surface of the secondary particle.

The secondary particle of the first positive active material according to embodiments of the present disclosure may include an open pore in the center of the internal part with a size (average diameter) of less than about 150 nm, for example, about 10 nm to about 148 nm. The open pore may be an exposed pore into which an electrolyte solution may flow in and out. In some embodiments, the open pore may be formed at a depth of less than or equal to about 150 nm, for example, about 0.001 nm to about 100 nm, or about 1 nm to about 50 nm, on average, from the surface of the secondary particle.

The first positive active material according to embodiments of the present disclosure may include a secondary particle formed by arranging the long axis (axes) of at least one part of the primary particles in a radial direction. At least one part (e.g., some) of the primary particles may have a radial arrangement structure. For example, each of the primary particles may have a plate shape, and a long-axis of at least one part of the primary particles (e.g., the external part) may be arranged in a radial direction. FIG. 2 is a schematic view describing a radial shape of a secondary particle according to embodiments of the present disclosure.

Figure 2:
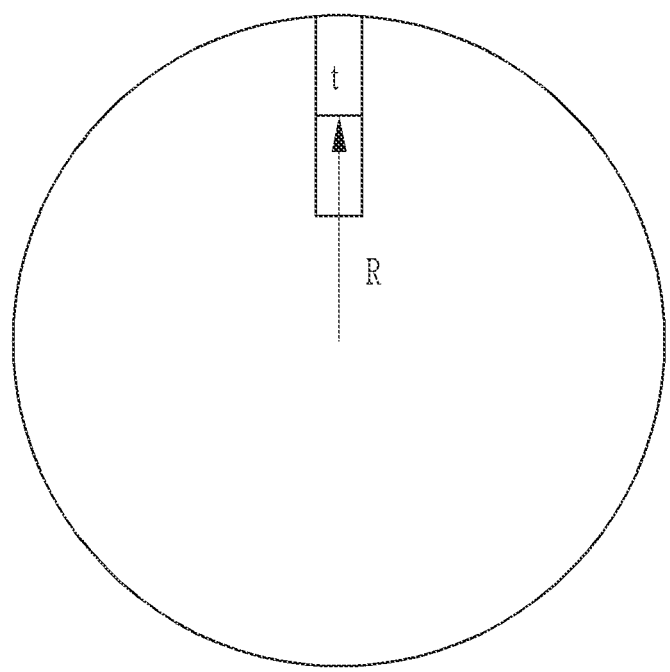
FIG. 2 is a schematic view describing a radial shape of a secondary particle according to embodiments of the present disclosure.

A "radial" arrangement structure refers to a structure in which the thickness (t) directions of the primary particles are arranged perpendicular to or within an angle of about ±5° to perpendicular with respect to the direction (R) toward the center of the secondary particles, as shown in FIG. 2.

The average length of the primary particles of the secondary particle may be about 0.01 µm to about 5 µm. For example, the average length may be about 0.01 µm to about 2 µm, about 0.01 µm to about 1 µm, about 0.02 µm to about 1 µm, or about 0.05 µm to about 0.5 µm. Herein, the term "average length" refers to an average length of the average long-axis length and the average short-axis length in the plane direction of the primary particles when the primary particles have a plate shape, or an average particle diameter when the primary particles have a spherical shape.

An average thickness of the primary particles of the secondary particle may be, for example, greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, greater than or equal to about 900 nm, greater than or equal to about 1 µm, greater than or equal to about 1.2 µm, greater than or equal to about 1.4 µm, and for example, less than or equal to about 13 µm, less than or equal to about 12 µm, less than or equal to about 11 µm, less than or equal to about 10 µm, less than or equal to about 9 µm, less than or equal to about 8 µm, less than or equal to about 7 µm, less than or equal to about 6 µm, less than or equal to about 5 µm, less than or equal to about 4 µm, less than or equal to about 3 µm, or less than or equal to about 2 µm. A ratio between the average thickness and the average length may be about 1:1 to about 1:10, for example about 1:1 to about 1:8, or about 1:1 to about 1:6.

As described above, when the average length, the average thickness, and the ratio between the average thickness and the average length of the primary particles satisfy the above ranges, a relatively large number of lithium diffusion paths between surface grain boundaries and crystal surfaces capable of transferring lithium to the external part of the secondary particle may be exposed, such that lithium diffusivity may be improved, and high initial efficiency and capacity may be enabled, for example when the sizes of the primary particles are sufficiently small and the primary particles are radially arranged in the external part (e.g., of the secondary particle). When the primary particles are arranged radially, the pores exposed at the surface between the primary particles may be directed toward the center direction (e.g., of the secondary particle), thereby promoting lithium diffusion from the surface. When lithium is deintercalated and/or intercalated into the radially arranged primary particles, substantially uniform shrinkage and expansion may be enabled, and the presence of pores in a (001) direction, along which particles expand during lithium intercalation, may alleviate stress caused by expansion. The probability of cracks occurring during shrinkage and expansion may be lowered due to the small sizes of the plate-shaped primary particles, and the pores in the internal part of the secondary particle may additionally alleviate stress caused by the volume changes, thereby decreasing crack generation between the primary particles during charging and discharging, improving cycle-life characteristics, and reducing a resistance increase.

Closed pores may be present in the internal part of the secondary particle, and closed pores and/or open pores may be present in the external part of the secondary particle. The closed pores may exclude or mostly exclude an electrolyte, while the open pores may include an electrolyte therein. Each closed pore may be an independent pore formed by closing the wall surfaces of the pore so that they are not connected to other pores; while the open pores may be formed as continuous pores connected to the outside of the particles when at least one part of each pore wall is formed to be an open structure.

The positive active material for a rechargeable lithium battery according to embodiments of the present disclosure may minimize or reduce direct contact between the cracked surface and the electrolyte solution even when cracks are generated, thereby suppressing an increase of a sheet resistance, due to the first positive active material as described above.

Figure 3:
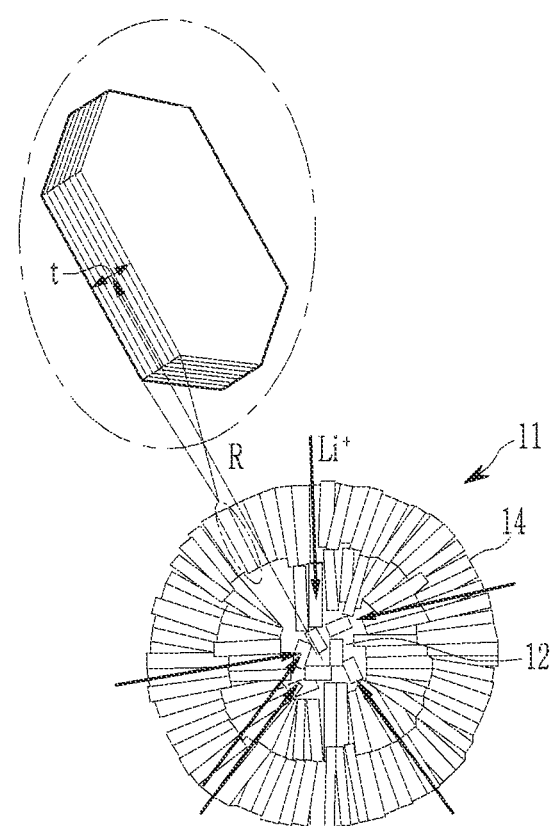
FIG. 3 is a schematic view showing a cross-sectional structure of a secondary particle according to embodiments of the present disclosure.

FIG. 3 is a schematic view showing a cross-sectional structure of a secondary particle according to embodiments of the present disclosure.

Referring to FIG. 3, the secondary particle 11 includes an external part 14 in which the plate-shaped primary particles are arranged in a radial direction and an internal part 12 in which the plate-shaped primary particles are irregularly arranged.

In the internal part 12, a larger amount of empty voids between the primary particles may be present compared to within the external part. The pore sizes and porosity in the internal part may be larger and more irregular than those in the external part. Here, the term "porosity" may refer to the total number of pores in a given particle volume and/or the total volume of the pores in a given particle volume. In FIG. 3, the arrow indicates a direction of lithium ion movement (e.g., during intercalation).

The secondary particle according to embodiments of the present disclosure may have a porous structure in the internal part, so that a diffusion distance of lithium ions to the internal part of the secondary particle may be decreased, and the external part of the secondary particle may be radially arranged toward the surface (e.g., may have radial pores extending toward the surface), so that lithium ions are easily intercalated into the surface. In some embodiments, the sizes of the primary particles of the positive active material for a rechargeable lithium battery may be sufficiently small so that it is easy to secure a lithium transfer path between the crystal grains. In some embodiments, the sizes of the primary particles may be sufficiently small and the pores between primary particles may alleviate volume changes that occur during charging and discharging so that particle stress when the volume changes during charging and discharging is minimized or reduced.

An average particle diameter of the secondary particle of embodiments of the present disclosure may be about 1 µm to about 20 µm. For example, it may be about 1 µm to about 18 µm, about 1 µm to about 16 µm, about 1 µm to about 15 µm, about 1 µm to about 10 µm, about 5 µm to about 20 µm, about 5 µm to about 18 µm, or about 5 µm to about 15 µm. For example, it may be about 1 µm to about 5 µm, or about 10 µm to about 20 µm.

The secondary particle according to embodiments of the present disclosure may include radial primary particles and non-radial primary particles. An amount of the non-radial primary particles may be less than or equal to about 20 wt %, about 0.01 wt % to about 10 wt %, or about 0.1 wt % to about 5 wt % based on a total of 100 wt % of the radial primary particles and non-radial primary particles together.

When the non-radial primary particles are included in the above range in addition to the radial primary particles within the secondary particle, a rechargeable lithium battery having improved cycle-life characteristics due to easy diffusion of lithium may be manufactured.

Hereinafter, a second positive active material according to embodiments of the present disclosure is described.

The second positive active material according to embodiments of the present disclosure may have a monolith structure. For example, the second positive active material may include or have a form in which a plurality of crystal particles are separated and/or dispersed so as to form independent and/or separated phases for each of the particles rather than a coagulated form, but two or three particles may be attached to each other (e.g., contiguous).

The shape of the second positive active material is not particularly limited, and may have a random shape (such as a sphere, an oval, a plate-shape, and/or a rod).

The surface of the second positive active material may be coated with a boron-containing compound. The boron-containing compound may be, for example, boron oxide, lithium borate, or a combination thereof, for example, $B_2O_3$, $LiBO_2$, $Li_3B_7O_{12}$, $Li_6B_4O_9$, $Li_3B_{11}O_{18}$, $Li_2B_4O_7$, $Li_3BO_3$, or a combination thereof.

In general, a positive active material may structurally collapse after repeated charges and discharges, and for example, a nickel-based positive active material may structurally collapse due to formation of NiO on the surface thereof. When the positive active material structurally collapses, cation mixing may occur, resulting in gas generation and/or deteriorated cycle-life characteristics. In addition, the positive active material may be destroyed or degraded (e.g., pulverized) after the repeated charges and discharges, and accordingly, one or more side reactions of the positive active material with an electrolyte solution may result in decreased battery capacity and deteriorated cycle-life characteristics. However, the second positive active material coated with the boron-containing compound may prevent or reduce diffusion of oxygen atoms to the surface, and may thereby suppress or decrease the structural collapse and pulverization resulting from the repeated charges and discharges. In addition, even though the positive active material may be pulverized (e.g., broken), side reactions with the electrolyte solution may be suppressed. Furthermore, lithium ions in the electrolyte solution may be easily accepted into the particles due to the boron-containing compound on the surface of the second positive active material, and the battery may thereby exhibit improved discharge capacity. Accordingly, a rechargeable lithium battery using the second positive active material coated with the boron-containing compound according to one embodiment may exhibit high capacity and excellent capacity retention, cycle-life characteristics, and/or the like.

The boron-containing compound may be continuously coated on the entire surface of the second positive active material, or may be coated as (in) an island shape thereon. As used herein, the term "island shape" may refer to one or more regions formed of the coating material that are not connected to each other. When an island shape coating is described as being substantially uniformly or evenly coated, the island shapes (coated regions) may be substantially evenly distributed over the outer surface of the particle.

An amount of boron based on a total amount of the second positive active material may be less than or equal to about 0.3 mol %, for example, about 0.01 mol % to about 0.3 mol %, or about 0.1 mol % to about 0.3 mol %. When the second positive active material having the monolith structure is included, structural collapse of the positive active material may be effectively suppressed or reduced, and side reactions between the electrolyte solution with the broken particles formed after the repeated charges and discharges may be prevented or reduced, and accordingly, the rechargeable lithium battery may have improved capacity, capacity retention, cycle-life characteristics, and/or the like. While it may be difficult for lithium to diffuse into the monolith structure of the particles, the boron-containing compound coated on the surface may facilitate easier diffusion of lithium thereinto, thereby preventing or reducing the escape (diffusion) of oxygen atoms to the surface of the positive active material. When the boron is included within the ranges, this effect may be maximized. On the other hand, when the content of the boron is about 0.3 mol % or higher, high temperature cycle-life characteristics of the battery may be deteriorated.

The second positive active material according to embodiments of the present disclosure may be included in an amount of about 10 wt % to about 50 wt % based on a total weight of the positive active material for a rechargeable lithium battery. For example, the second positive active material may be included in an amount of greater than or equal to about 10 wt %, greater than or equal to about 15 wt %, greater than or equal to about 20 wt %, or greater than or equal to about 25 wt %, and for example, less than or equal to about 50 wt %, less than or equal to about 45 wt %, less than or equal to about 40 wt %, or less than or equal to about 35 wt %.

In some embodiments, the primary particles in the first positive active material and the second positive active material may each have a suitable size. An average particle diameter of the second positive active material may be about 0.05 μm to about 10 μm. For example, it may be about 0.1 μm to about 10 μm, about 0.1 μm to about 8 μm, about 0.1 μm to about 7 μm, about 0.1 μm to about 6 μm, about 0.1 μm to about 5 μm, or about 1 μm to about 4 μm. In this way, the primary particles of the first positive active material and the second positive active material may each have a suitable size, so that a density of the positive active material for a rechargeable lithium battery according to embodiments of the present disclosure may be further increased.

The first positive active material according to embodiments of the present disclosure and the second positive active material may each independently be or include a nickel-based positive active material represented by Chemical Formula 1:

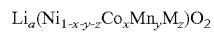    Chemical Formula 1 wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and $0.95 \leq a \leq 1.3$, $x \leq (1-x-y-z)$, $y \leq (1-x-y-z)$, $0 < x < 1$, $0 \leq y < 1$, and $0 \leq z < 1$. Here, in the nickel-based positive active material represented by Chemical Formula 1, the nickel content may be greater than or equal to the cobalt content, the nickel content may be greater than or equal to the manganese content, and the nickel content may be greater than or equal to the M content.

In Chemical Formula 1, $0.95 \leq a \leq 1.3$, for example, $1.0 \leq a \leq 1.1$; $0 < x \leq 0.33$, for example $0.1 \leq x \leq 0.33$; $0 < y \leq 0.5$, for example $0.05 \leq y \leq 0.3$; $0 \leq z \leq 0.05$; and $0.33 \leq (1-x-y-z) \leq 0.95$, for example $0.33 \leq (1-x-y-z) \leq 0.95$.

For example, in Chemical Formula 1, $0 \leq z \leq 0.05$, $0 < x \leq 0.33$, and $0 \leq y \leq 0.33$.

For example, in Chemical Formula 1, (1-x-y-z)≥0.4, for example (1-x-y-z)≥0.5, or (1-x-y-z)≥0.6.

In the nickel-based positive active material, the nickel content may be greater than or equal to about 50 mol %, for example greater than or equal to about 55 mol %, or greater than or equal to about 60 mol % and for example less than or equal to about 95 mol %, less than or equal to about 90 mol %, less than or equal to about 80 mol %, less than or equal to about 70 mol %, less than or equal to about 60 mol %, or less than or equal to about 63 mol %, for example about 50 mol % to about 95 mol %, for example about 70 mol % to about 95 mol %, or about 80 mol % to about 95 mol % based on a total amount of transition metals (Ni, Co, and/or Mn, etc.). In the nickel-based positive active material, the nickel content may be larger than each of the manganese content, the cobalt content, and the element M content.

In the nickel-based positive active material, the nickel content may be larger than the content of the other transition metals based on 1 mol (e.g. molar equivalent) of total transition metals. In this way, when the nickel-based positive active material having a large nickel content is used as the first positive active material and the second positive active material, lithium diffusivity may be high, conductivity may be good, and a higher capacity at the same voltage may be obtained when the rechargeable lithium battery employing the positive electrode including the same is used.

In some embodiments, a pressed density of the positive active material for a rechargeable lithium battery including the first positive active material and the second positive active material may be, for example, greater than or equal to about 3.3 g/cc, greater than or equal to about 3.35 g/cc, greater than or equal to about 3.4 g/cc, greater than or equal to about 3.45 g/cc, or greater than or equal to about 3.5 g/cc. In some embodiments, the pressed density of the positive active material for a rechargeable lithium battery may be obtained by inserting about 3 g of the positive active material for a rechargeable lithium battery in a pressed density-measuring device and then, pressing it with a power of about 3 tons for about 30 seconds. Accordingly, the positive active material for a rechargeable lithium battery including the first and second positive active materials having different sizes according to embodiments of the present disclosure may secure a positive electrode having excellent electrode plate density.

Hereinafter, a positive active material for a rechargeable lithium battery according embodiments of the present disclosure is explained.

The positive active material for a rechargeable lithium battery according to embodiments of the present disclosure includes: the first positive active material including the secondary particle including at least two agglomerated primary particles, wherein at least one part of the primary particles has a radial arrangement structure; and the second positive active material coated with the boron-containing compound on the surface thereof and having the monolith structure. In some embodiments, the secondary particle may further include particles having a monolith structure. For example, the positive active material may have substantially the same constitution (e.g., composition) as described above, except that the secondary particle of the first positive active material may additionally further include particles having a monolith structure.

In some embodiments, the particles having a monolith structure in the first positive active material may be adhered or attached to an external part of the secondary particle, and/or in some embodiments, dispersed in an internal part thereof. For example, the particles having a monolith structure may be agglomerated (physically and/or chemically bound) to the secondary particle, or may not be physically and/or chemically bound to the secondary particle but may fill pores in the secondary particle and/or contact walls of the pores.

Hereinafter, referring to FIG. 4, a structure of a rechargeable lithium battery including a positive electrode including the positive active material for a rechargeable lithium battery according to embodiments of the present disclosure, and a method of manufacturing the rechargeable lithium battery are illustrated.

Figure 4:
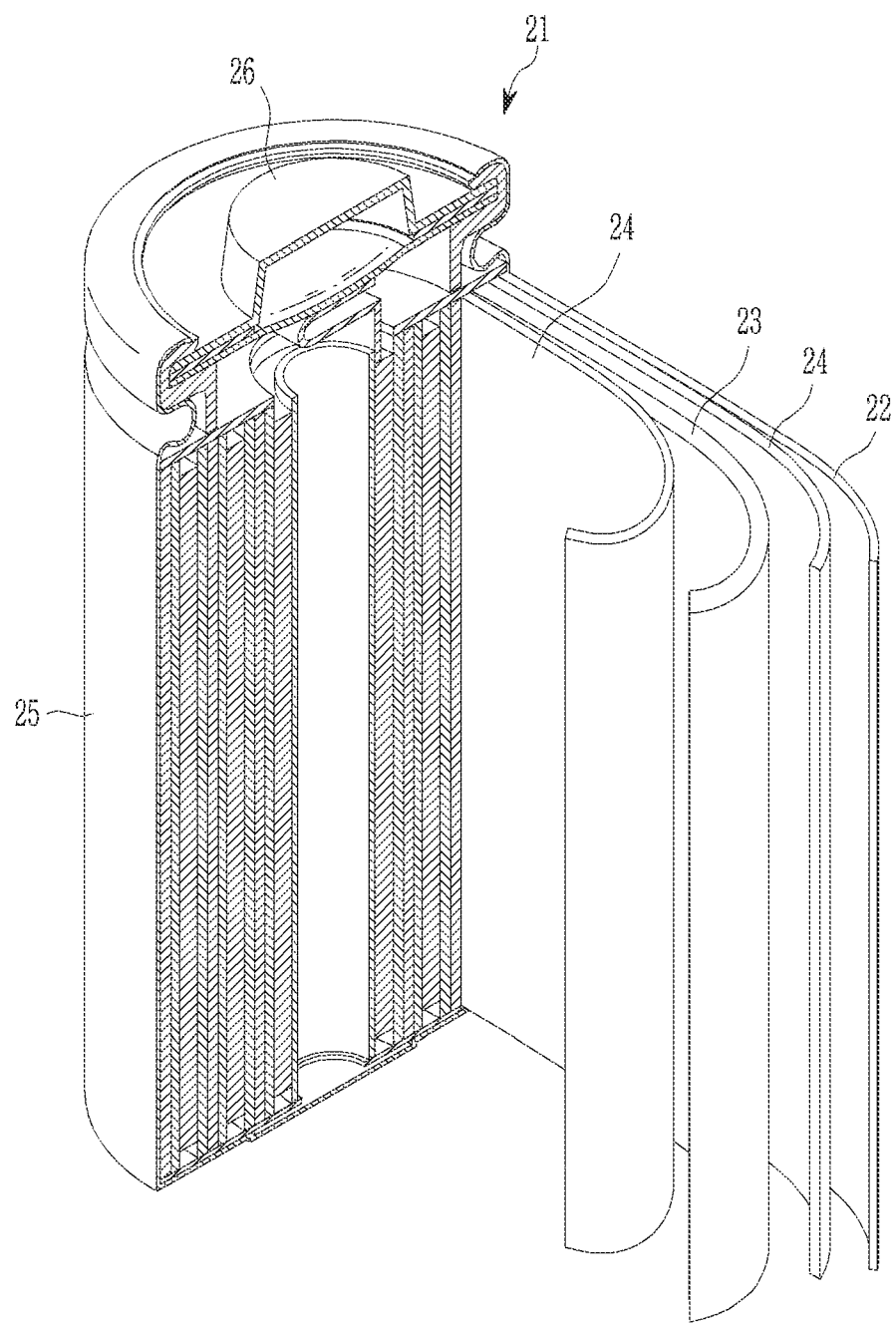
FIG. 4 is a schematic view showing a structure of a rechargeable lithium battery including a positive electrode including a positive active material for a rechargeable lithium battery according to embodiments of the present disclosure.

FIG. 4 is a schematic view showing a structure of a rechargeable lithium battery including a positive electrode including a positive active material for a rechargeable lithium battery according to embodiments of the present disclosure.

Referring to FIG. 4, a rechargeable lithium battery 21 includes a positive electrode 23 including the positive active material for a rechargeable lithium battery, a negative electrode 22, and a separator 24.

The positive electrode 23 and the negative electrode 22 may be manufactured by coating a composition for forming a positive active material layer and a composition for forming a negative active material layer on each current collector, respectively, and drying the same.

The composition for the positive active material layer may be prepared by mixing a positive active material, a conductive agent, a binder, and a solvent, wherein the positive active material is the nickel-based active material represented by Chemical Formula 1.

The binder may facilitate binding between the active materials, conductive agent, and/or the like as well as binding these materials to a current collector, and may be added in an amount of about 1 to about 50 parts by weight based on a total weight of 100 parts by weight of the positive active material. Non-limiting examples of such a binder include polyvinylidene fluoride, polyvinyl alcohol, carboxymethyl cellulose (CMC), starch, hydroxypropyl cellulose, recycled cellulose, polyvinylpyrrolidone, tetrafluoroethylene, polyethylene, polypropylene, an ethylene-propylene-diene terpolymer (EPDM), sulfonated EPDM, a styrene butadiene rubber, a fluorine rubber, various copolymers, and/or the like. The amount thereof may be about 2 to about 5 parts by weight based on a total weight of 100 parts by weight of the positive active material. When the amount of the binder is within this range, the binding force of the active material layer to the current collector may be suitable or good.

The conductive agent is not particularly limited as long as it does not cause a chemical change of a battery (e.g. an unwanted chemical reaction), and has conductivity. Non-limiting examples of the conductive agent include graphite (such as natural graphite and/or artificial graphite); a carbon-based material (such as carbon black, acetylene black, KETJENBLACK®, channel black, furnace black, lamp black, summer black, and/or the like); a conductive fiber (such as a carbon fiber and/or a metal fiber, and/or the like); carbon fluoride; a metal powder (such as an aluminum and/or nickel powder); zinc oxide, a conductive whisker (such as potassium titanate, and/or the like); a conductive metal oxide (such as a titanium oxide); and a conductive material (such as a polyphenylene derivative, and/or the like).

The amount of the conductive agent may be about 2 to about 5 parts by weight based on a total weight of 100 parts by weight of the positive active material. When the amount of the conductive agent is within this range, the conductivity characteristics of the resultant electrode may be improved.

Non-limiting examples of the solvent include N-methyl pyrrolidone, and/or the like.

The amount of the solvent may be about 1 part by weight to about 10 parts by weight based on a total weight of 100 parts by weight of the positive active material. When the amount of the solvent is within this range, the active material layer may be easily formed. The positive current collector may have a thickness of about 3 μm to about 500 μm. The material for the positive current collector is not particularly limited as long as it does not cause a chemical change in the battery (e.g. an unwanted chemical reaction) and has high conductivity, and may be for example, stainless steel, aluminum, nickel, titanium, heat-treated carbon, and/or aluminum or stainless steel that is surface treated with carbon, nickel, titanium, and/or silver. The current collector may have fine irregularities formed on its surface to increase adhesion to the positive active material, and may be provided in any suitable form (such as a film, a sheet, a foil, a net, a porous body, foam, and/or a non-woven fabric body).

Separately, a negative active material, a binder, a conductive agent, and a solvent may be mixed to prepare a composition for a negative active material layer. The negative active material may be or include a material capable of intercalating and deintercalating lithium ions. Non-limiting examples of the negative active material include e a carbon-based material (such as graphite and/or carbon), a lithium metal, an alloy thereof, a silicon oxide-based material, and/or the like. In some embodiments, silicon oxide may be used. The binder may be added in an amount of about 1 part by weight to about 50 parts by weight based on a total weight of 100 parts by weight of the negative active material. Non-limiting examples of the binder may be substantially the same as available for the positive electrode. The conductive agent may be used in an amount of about 1 part by weight to about 5 parts by weight based on a total weight of 100 parts by weight of the negative active material. When the amount of the conductive agent is within this range, the conductivity characteristics of the resultant electrode may be improved. An amount of the solvent may be about 1 part by weight to about 10 parts by weight based on a total weight of 100 parts by weight of the negative active material. When the amount of the solvent is within this range, the negative active material layer may be easily formed. The conductive agent and the solvent may use substantially the same materials as those used in manufacturing the positive electrode. The negative current collector may have a thickness of about 3 μm to about 500 μm. The material for the negative current collector is not particularly limited as long as it does not cause a chemical change in the battery (e.g. an unwanted chemical reaction) and has high conductivity. Non-limiting examples include copper; stainless steel; aluminum; nickel; titanium; heat-treated carbon; copper and/or stainless steel surface-treated with carbon, nickel, titanium, and/or silver; an aluminum-cadmium alloy; and/or the like. The negative current collector may have fine irregularities formed on the surface to increase adhesion to the negative active materials, and may be provided in any suitable form (such as a film, a sheet, a foil, a net, a porous body, foam, and/or a non-woven fabric body), similar to the positive current collector.

A separator may be between the positive electrode and the negative electrode, each being manufactured according to the above processes. The separator may have a pore diameter of about 0.01 μm to about 10 μm, and a thickness of about 5 μm to about 300 μm. Non-limiting examples include an olefin-based polymer (such as polypropylene, polyethylene, and/or the like); and/or a sheet or a nonwoven fabric formed of a glass fiber. When a solid electrolyte such as a polymer is used as the electrolyte, the solid electrolyte may also serve as the separator.

A lithium salt-containing non-aqueous electrolyte may be composed of a non-aqueous electrolyte and a lithium salt. The non-aqueous electrolyte may be a non-aqueous electrolyte, an organic solid electrolyte, or an inorganic solid electrolyte. The non-aqueous electrolyte may be or include, for example, an aprotic organic solvent (such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like). The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, and/or the like. The inorganic solid electrolyte may be, for example, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and/or the like. The lithium salt may be a material that is readily soluble in the non-aqueous electrolyte, for example, $LiCl$, $LiBr$, $LiI$, $LiClO_4$, $LiBF_4$, $LB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonates, tetraphenyl lithium borate, lithium imides, and/or the like.

The positive electrode 23, the negative electrode 22, and the separator 24 are wound or folded and accommodated in the battery case 25. Then, an organic electrolyte solution is injected into the battery case 25 and the cap assembly 26 is sealed to complete the rechargeable lithium battery 21 as shown in FIG. 4. The battery case 25 may have any suitable shape or form (such as cylindrical, prismatic, thin film, and/or the like). In some embodiments, the rechargeable lithium battery 20 may be a large-scale thin film-type battery. The rechargeable lithium battery may be a lithium ion battery. For example, a cell structure including a separator between the positive electrode and the negative electrode may be formed. The cell may be stacked in a bi-cell structure and then impregnated with an organic electrolyte solution, and the resulting product may be placed in a pouch and sealed to manufacture a lithium ion polymer battery. In some embodiments, a plurality of cell structures may be stacked to form a battery pack, which may be used in devices requiring a high capacity and high power. For example, the battery pack may be used in a laptop, a smart phone, an electric vehicle, and/or the like.

In some embodiments, the rechargeable lithium battery may have improved storage stability, cycle-life characteristics, and high rate capacity characteristics at a high temperature, and may be used in an electric vehicle (EV). For example, it may be used in a hybrid vehicle such as a plug-in hybrid electric vehicle (PHEV). The rechargeable lithium battery according to embodiments of the present disclosure may exhibit improved electrode plate density with respect to the positive active material, and thus may have suitable electrochemical characteristics for a rechargeable lithium battery.

Hereinafter, a method of preparing the positive active material for a rechargeable lithium battery according to embodiments of the present disclosure is described.

A method of preparing the positive active material for a rechargeable lithium battery according to embodiments of the present disclosure may include forming a first nickel-based oxide using a first precursor, obtaining a second nickel-based oxide using a second precursor, mixing the second nickel-based oxide and a boron-containing precursor, subjecting the mixture to a third heat-treatment to obtain a second nickel-based oxide coated with the boron-containing compound, and mixing the first nickel-based oxide and the second nickel-based oxide coated with the boron-containing compound to obtain an positive active material including the first positive active material and the second positive active material coated with the boron-containing compound. Hereinafter, the method is explained in more detail.

First, the first precursor is subjected to a first heat-treatment under an oxidizing gas atmosphere to obtain the first nickel-based oxide.

In some embodiments, the oxidizing gas atmosphere may use an oxidizing gas (such as oxygen and/or air). The first heat-treatment may be, for example, performed at about 800° C. to about 900° C. A time for the first heat-treatment may be selected according to the heat-treatment temperature and/or the like, and for example, may be about 5 to about 15 hours.

The first precursor according to embodiments of the present disclosure may include Li, Ni, Co, Mn, and optionally an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); the elements may be included in set or predetermined mole ratios, for example, within ranges satisfying each stoichiometric ratio.

In some embodiments, the first precursor may be obtained by mixing a first composite metal hydroxide with a lithium-based material.

The first composite metal hydroxide may include at least nickel, and may further include elements selected from the above group within a range satisfying a stoichiometric ratio, and the nickel and additional elements may be bound to a hydroxyl group. For example, the first composite metal hydroxide may be a nickel-based composite metal hydroxide, for example, a nickel-cobalt-aluminum hydroxide, or a nickel-cobalt-manganese hydroxide.

The lithium-based material may serve as a lithium source, so that the product positive active material for a rechargeable lithium battery according to embodiments of the present disclosure may function as a positive active material. The type or kind of lithium-based material according to embodiments of the present disclosure is not particularly limited and may include, for example, $Li_2CO_3$, LiOH, a hydrate thereof, or a combination thereof.

For example, the first precursor may be a mixture of a nickel-based composite metal hydroxide and a lithium-based material. The first nickel-based oxide obtained by the first heat-treatment of the first precursor in an oxidizing gas atmosphere may be a lithium nickel-based composite oxide, for example, a lithium nickel-cobalt-aluminum oxide or a lithium nickel-cobalt-manganese oxide.

In some embodiments, the second precursor, separately from the first precursor, may be subjected to a second heat-treatment under an oxidizing gas atmosphere. The resulting material may be pulverized to obtain the second nickel-based oxide including particles having a monolith structure. For example, the process of obtaining the second nickel-based oxide may further include pulverizing the material obtained after subjecting the second precursor to the second heat-treatment in an oxidizing gas atmosphere, the resulting particles having a monolith structure. The resultant may be mixed with a boron-containing material and subjected to a third heat-treatment, thereby obtaining a second nickel-based oxide coated with a boron-containing compound.

In some embodiments, the oxidizing gas atmosphere may use an oxidizing gas (such as oxygen and/or air). The second heat-treatment may be, for example, performed at about 800° C. to about 1000° C. A time for the second heat-treatment may be selected according to the heat-treatment temperature and/or the like, and for example, may be about 5 to about 20 hours. The second precursor may be obtained by mixing a second composite metal hydroxide with the aforementioned lithium-based material.

The second composite metal hydroxide, may include Li, Ni, Co, Mn, and optionally an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); the elements may be included in set or predetermined mole ratios, for example, within ranges satisfying each stoichiometric ratio. The elements (including at least nickel and a hydroxyl group) may be bound in a range satisfying a stoichiometric ratio. The second composite metal hydroxide may be, for example, a nickel-based composite metal hydroxide, for example, a nickel-cobalt-aluminum hydroxide, or a nickel-cobalt-manganese hydroxide.

An average particle diameter of the second composite metal hydroxide may be, for example, greater than or equal to about 0.5 μm, greater than or equal to about 1.0 μm, greater than or equal to about 1.5 μm, greater than or equal to about 2.0 μm, and for example, less than or equal to about 10 μm, less than or equal to about 8 μm, less than or equal to about 6 μm, less than or equal to about 5 μm, or less than or equal to about 4 μm.

In some embodiments, the second composite metal hydroxide may have a specific surface area of about 1 $m^2/g$ to about 30 $m^2/g$, as measured using a BET method. For example, the specific surface area may be about 2 $m^2/g$ to about 25 $m^2/g$, for example, about 5 $m^2/g$ to about 25 $m^2/g$. When the second composite metal hydroxide has a specific surface area satisfying this range, the second nickel-based oxide may be pulverized into particles having a monolith structure within the above average particle diameter range during a pulverization process described below, thereby reducing an amount of residual lithium.

The second nickel-based oxide obtained by performing the second heat-treatment of the second precursor in an oxidizing gas atmosphere may be a lithium nickel-based composite oxide, for example, a lithium nickel-cobalt-aluminum oxide, or a lithium nickel-cobalt-manganese oxide.

Subsequently, the materials subjected to the second heat-treatment may be pulverized to obtain the second nickel-based oxide including the particles having a monolith structure within the above average particle diameter range. The second nickel-based oxide may have a smaller average particle diameter than the above first nickel-based oxide. The pulverization may be performed using any suitable pulverizing device (such as a jet mill and/or the like).

The particles having a monolith structure and the average particle diameter range described above may not be agglomerated, but dispersed as described above. The amounts and/or a mixing ratio of the lithium-based material and the second composite metal hydroxide are not particularly limited, but may simultaneously (concurrently) be adjusted within a suitable range to minimize or reduce the amount of excess lithium salt and thereby the lithium-based material residue after preparing the nickel-based active material.

In some embodiments, a mole ratio (Li/Me) e.g., of lithium (Li) relative to the remaining metal elements (Me) in the second precursor may be, for example, greater than or equal to about 0.8, greater than or equal to about 0.85, greater than or equal to about 0.9, greater than or equal to about 0.95, or greater than or equal to about 1.0, and for example, less than or equal to about 1.2, less than or equal to about 1.1, or less than or equal to about 1.05.

In some embodiments, a mole ratio of Ni, Co, Mn, and additional selected elements in the first composite metal hydroxide and the second composite metal hydroxide may be freely selected within a range for preparing the nickel-based positive active material represented by Chemical Formula 1, but a mole ratio of Ni may be adjusted to be larger than the mole ratios of Co, Mn, and the additional selected elements. In some embodiments, the second precursor according to embodiments of the present disclosure may be adjusted to have the same mole ratio as the above first precursor.

Subsequently, the second nickel-based oxide having the monolith structure and the boron-containing precursor are mixed and then, thirdly heat-treated to coat the boron-containing compound on the second nickel-based oxide. Herein, the boron-containing precursor is a material, which is coated on the surface of the second nickel-based oxide through the heat-treatment and present as the boron-containing compound thereon. For example, the boron-containing precursor may be boric acid ($H_3BO_3$), $B_2O_3$, $C_6H_5B(OH)_2$, $(C_6H_5O)_3B$, $[CH_3(CH_2)_3O]_3B$, $C_{13}H_{19}BO_3$, $C_3H_9B_3O_6$, $(C_3H_7O)_3B$, or a combination thereof.

The third heat-treatment of the mixture of the second nickel-based oxide and the boron-containing precursor may be performed at about 300° C. to about 500° C. A time for the third heat-treatment may be selected according to the heat-treatment temperature and/or the like, and for example, may be about 3 to about 15 hours. When the third heat-treatment is performed within the temperature and time ranges, the boron-containing compound may be substantially uniformly coated on the second nickel-based oxide.

An amount of the boron-containing precursor based on 100 parts by weight of the second nickel-based oxide may be about 0.01 parts by weight to about 0.35 parts by weight, or about 0.1 parts by weight to about 0.35 parts by weight, or about 0.1 parts by weight to about 0.3 parts by weight. Within these content ranges, it is possible to obtain a second nickel-based oxide uniformly coated with a boron-containing compound.

Thereafter, the first nickel-based oxide and the second nickel-based oxide coated with the boron-containing compound are mixed. In some embodiments, a mixing ratio of the first nickel-based oxide and the second nickel-based oxide coated with the boron-containing compound may be, for example, about 9:1 to about 5:5, about 8:2 to about 5:5, about 8:2 to about 6:4, or about 7:3 based on weight.

The prepared positive active material for a rechargeable lithium battery may include the first positive active material including the secondary particle including at least two agglomerated primary particles, along with the second positive active material coated with the boron-containing compound while having a monolith structure as described above, and at least one part of the primary particles in the secondary particle of the first active material may be arranged in a radial shape. The prepared positive active material and a rechargeable lithium battery including the same may show excellent stability and electrochemical characteristics, as described above.

Hereinafter, the embodiments are illustrated in more detail with reference to examples. These examples, however, are not in any sense to be interpreted as limiting the scope of the disclosure.

Example 1

1. Preparing Process of Composite Metal Hydroxide
(1) Preparing Process of First Composite Metal Hydroxide
A nickel-based active material precursor ($Ni_{0.945}Co_{0.04}Al_{0.015}OH$) was synthesized using a co-precipitation method to prepare a first nickel-based oxide. In the following preparing process, the nickel-based active material precursor was synthesized using raw metal materials (such as nickel sulfate, cobalt sulfate, and aluminum nitrate).
First Act: 2.5 kW/m³, $NH_4OH$ 0.40 M, pH 10.5 to 11.5, Reaction Time: 6 Hours First, ammonium hydroxide having a concentration of 0.40 M was put in a reactor. The raw metal material and a complexing agent were added thereto at a rate of 85 mL/min and 10 mL/min, respectively, with an agitation power of 2.5 kW/m³ at a reaction temperature of 50° C. to start the reaction.

The reaction proceeded for 6 hours, during which time NaOH was injected to maintain pH. The core particles obtained from the reaction had an average size of about 6.5 μm to about 7.5 μm. The second act was performed as follows.
Second Act: 2.0 kW/m³, $NH_4OH$ 0.45 M, pH 11 to 12, Reaction Time: 18 Hours The complexing agent was maintained at a concentration of 0.45 M by changing the addition rates of the raw metal material and the complexing agent to 85 mL/min and 12 mL/min, respectively, while the reaction temperature was maintained at 50° C. The reaction proceeded for 6 hours, during which time NaOH was injected to maintain pH. Herein, the agitation power was adjusted to 2.0 kW/m³, which is lower than that of the first act. The particles having a core and a middle layer, as obtained from the reaction, had an average size of about 13.5 μm to about 14 μm.
Third Act: 1.5 kW/m³, $NH_4OH$ 0.45 M, pH 10.5 to 11.5, Reaction Time: 14 Hours The reaction temperature was maintained at 50° C., and the rate of addition of the metal raw materials and the complexing agent and the concentration of the complexing agent were the same as in the second act. The reaction proceeded for 14 hours, during which time NaOH was injected to maintain pH. At this time, the agitation power was lowered to 1.5 kW/m³, which is lower than that in second act, and the reaction proceeded.
Post-Processing The resultant material was washed and dried with hot air at about 150° C. for 24 hours to obtain a first composite metal hydroxide ($Ni_{0.945}Co_{0.04}Al_{0.015}OH$).
(2) Preparing Process of Second Composite Metal Hydroxide Separately from the above, nickel sulfate ($NiSO_4 \cdot 6H_2O$), cobalt sulfate ($CoSO_4 \cdot 7H_2O$), and manganese sulfate ($MnSO_4 \cdot H_2O$) in a mole ratio of 88:8:4 were dissolved in distilled water (as a solvent) to prepare a mixed solution. An ammonium hydroxide ($NH_4OH$) dilute solution and sodium hydroxide (NaOH) as a precipitator were prepared as precursors for forming a complexing compound. Subsequently, the raw metal material mixed solution, the ammonium hydroxide, and the sodium hydroxide were added to a reactor. The obtained mixture was reacted for 20 hours while being stirred. Subsequently, the obtained slurry solution in the reactor was filtered, washed with distilled water having high purity, and dried for 24 hours to yield a second composite metal hydroxide ($Ni_{0.88}Co_{0.08}Mn_{0.04}(OH)_2$) powder. The second composite metal hydroxide powder had an average particle diameter of about 4.0 μm and a specific surface area of about 15 m$^2$/g as measured using a BET method.

2. Preparing Process of Positive Active Material
(1) Preparing Process of First Nickel-Based Oxide The obtained first composite metal hydroxide was mixed with LiOH in a mole ratio of 1:1 to obtain a first precursor, and the first precursor was primarily heat-treated at about 700° C. for 10 hours under an oxygen atmosphere to obtain first nickel-based oxide ($LiNi_{0.945}Co_{0.04}Al_{0.015}O_2$).

An average particle diameter of the obtained first nickel-based oxide was 13.8 μm.

(2) Preparing Process of Second Nickel-Based Oxide

Subsequently, the obtained second composite metal hydroxide was mixed with LiOH to satisfy Li/(Ni+Co+Mn)=1.05 to obtain a second precursor, and the second precursor was put in a furnace and secondarily heat-treated at 910° C. for 8 hours under an oxygen atmosphere to obtain second nickel-based oxide ($LiNi_{0.88}Co_{0.08}Mn_{0.04}O_2$). The obtained second nickel-based oxide was pulverized for about 30 minutes to separate/disperse a plurality of second nickel-based oxide having a monolith structure.

An average particle diameter of the second nickel-based oxide having a monolith structure was 3.7 μm.

(3) Boron Coating Process of Second Nickel-Based Oxide

The obtained second nickel-based oxide having a monolith structure was mixed with boric acid in an amount of 0.19 wt % (or 0.3 mol %) with a dry mixer and then, thirdly heat-treated at 350° C. for 8 hours. Accordingly, the second nickel-based having a monolith structure was coated with boron oxide and lithium borate on the surface.

(4) Mixing Process of First Nickel-Based Oxide and Second Nickel-Based Oxide

The first nickel-based oxide and the second nickel-based oxide coated with the boron-containing compound were mixed in a weight ratio of 8:2 to prepare a positive active material including a first positive active material and a second positive active material coated with the boron-containing compound.

Comparative Example 1

A positive active material was prepared according to the substantially same method as Example 1, except that the second nickel-based oxide was not coated with the boron-containing compound in Example 1.

Comparative Example 2

A positive active material was prepared according to substantially the same method as Example 1, except that the second nickel-based oxide was prepared in the following method and not coated with the boron-containing compound in Example 1:

(2) Preparing Process of Second Nickel-Based Oxide (Comparative Example 2)

Subsequently, the obtained second composite metal hydroxide was mixed with LiOH to satisfy Li/(Ni+Co+Mn)=1.00 and then, put in a furnace and secondarily heat-treated under an oxygen atmosphere at 725° C. for 20 hours to obtain second nickel-based oxide ($LiNi_{0.88}Co_{0.08}Mn_{0.04}O_2$).

An average particle diameter of the first nickel-based oxide was 4.6 μm.

Comparative Example 3

A positive active material was prepared according to substantially the same method as Example 1, except that the first nickel-based oxide was prepared in the following method:

(1) Preparing Process of First Nickel-Based Oxide (Comparative Example 3)

The obtained first composite metal hydroxide was mixed with LiOH in a mole ratio of 1:1, and with boric acid in an amount of 0.084 wt % (or 0.125 mol %) with a dry mixer to obtain a first precursor, and the first precursor was primarily heat-treated at about 700° C. for 10 hours under an oxygen atmosphere to obtain first nickel-based oxide ($LiNi_{0.945}Co_{0.04}Al_{0.015}O_2$) coated with the boron-containing compound. An average particle diameter of the obtained first nickel-based oxide was 13.8 μm.

Manufacturing Coin Half-Cells

Coin half-cells using the positive active materials according to Example 1 and Comparative Examples 1 to 3 were manufactured as follows.

96 g of the positive active material for a rechargeable lithium battery according to each of Example 1 and Comparative Examples 1 to 3, 2 g of polyvinylidene fluoride, and 137 g of N-methylpyrrolidone as a solvent, and 2 g of carbon black as a conductive agent were mixed and degassed using a blender to obtain substantially uniformly-dispersed slurries for a positive active material layer.

The slurry for a positive active material layer was coated on an aluminum foil and thus formed into a thin electrode plate, dried at 135° C. for greater than or equal to 3 hours, and compressed and vacuum-dried to manufacture a positive electrode.

The positive electrode and a lithium metal foil as a counter electrode were used to manufacture a 2032 type coin half-cell. A separator formed of a porous polyethylene (PE) film (thickness: about 16 μm) was placed between the positive electrode and the lithium metal counter electrode, and an electrolyte solution was injected thereinto to manufacture the 2032 type coin cell. Herein, the electrolyte solution was prepared by mixing ethylene carbonate (EC) and ethyl methyl carbonate (EMC) in a volume ratio of 3:5, and dissolving 1.1 M $LiPF_6$ therein.

Evaluation Example 1: Charge and Discharge Capacity, Charge and Discharge Efficiency, and Cycle-Life Characteristics The coin half-cells according to Example 1 and Comparative Examples 1 to 3 were charged up to a voltage of 4.3 V at a constant current of 1C and discharged at 1C down to a cut-off voltage of 3.0 V at 45° C. to measure initial discharge capacity, and were then similarly charged and discharged for 50 cycles in order to measure the discharge capacity at the 50th cycle and thus evaluate capacity retention, and the results are shown in Table 1:

TABLE 1

| | Initial discharge capacity (mAh/g) | 50$^{th}$ capacity retention (%) | Capacity per volume (mAh/cc) |
|---|---|---|---|
| Example 1 | 214.4 | 92.7 | 755 |
| Comparative Example 1 | 211.4 | 90.0 | 744 |
| Comparative Example 2 | 214.6 | 88.6 | 734 |
| Comparative Example 3 | 204.2 | — | 673 |

Referring to Table 1, Comparative Example 1 including the second positive active material having the monolith structure exhibited improved 50$^{th}$ capacity retention but reduced initial discharge capacity, compared with Comparative Example 2 using a general nickel-based oxide having a structure with assembled primary particles (e.g., not a monolith structure).

However, Example 1 using the second positive active material coated with the boron-containing compound and having the monolith structure exhibited improved 50$^{th}$ capacity retention without deteriorating the initial discharge capacity, unlike Comparative Example 1. In addition, the second positive active material having the monolith structure additionally improved capacity per volume.

Comparative Example 3 using the first positive active material coated with the boron-containing compound and second positive active material coated with the boron-containing compound and having the monolith structure exhibited reduced initial discharge capacity and capacity per volume.

In order to examine the boron-coating effect in the monolith structure of the second nickel-based oxide, the coin half-cells of Examples 2 to 6 and Comparative Example 4 including only a second positive active material, but not a first positive active material, as a positive active material, were manufactured by the following method.

Example 2

A coin half-cell was prepared according to substantially the same method as Example 1, except that (i) the second nickel-based oxide and boric acid in an amount of 0.06 wt % (or 0.1 mol %) were mixed with a dry mixer, and then heat-treated at 325° C. for 8 hours in the boron coating process of the second nickel-based oxide, and (ii) only the second positive active material coated with the boron-containing compound and having the monolith structure was used as the positive active material.

Comparative Example 4

A coin half-cell was prepared according to substantially the same method as Comparative Example 1, except that using only a non-coated second positive active material as a positive active material.

Example 3

A coin half-cell was prepared according to substantially the same method as Example 1, except that (i) the second nickel-based oxide and boric acid in an amount of 0.06 wt % (or 0.1 mol %) were mixed with a dry mixer, and then heat-treated at 350° C. for 8 hours in the boron coating process of the second nickel-based oxide, and (ii) only the second positive active material coated with the boron-containing compound and having the monolith structure was used as the positive active material.

Example 4

A coin half-cell was prepared according to substantially the same method as Example 1, except that only the positive active material coated with the boron-containing compound and having the monolith structure was used as the positive active material.

Example 5

A coin half-cell was prepared according to substantially the same method as Example 1, except that (i) the second nickel-based oxide and boric acid in an amount of 0.32 wt % (or 0.5 mol %) were mixed with a dry mixer, and then heat-treated at 350° C. for 8 hours in the boron coating process of the second nickel-based oxide, and (ii) only the second positive active material coated with the boron-containing compound and having the monolith structure was used as the positive active material. The amount of boron in the second nickel-based oxide was 460 ppm, as measured by inductively coupled plasma (ICP) analysis.

Example 6

A coin half-cell was prepared according to substantially the same method as Example 1, except that (i) the second nickel-based oxide and boric acid in an amount of 0.06 wt % (or 0.1 mol %) were mixed with a dry mixer, and then heat-treated at 375° C. for 8 hours in the boron coating process of the second nickel-based oxide, and (ii) only the second positive active material coated with the boron-containing compound and having the monolith structure was used as the positive active material.

Evaluation Example 2: Charge and Discharge Capacity, Charge and Discharge Efficiency, and Cycle-Life Characteristics The coin half-cells according to Examples 2 to 6 and Comparative Example 4 were charged up to a voltage of 4.3 V at a constant current of 1C and discharged at 1C down to a cut-off voltage of 3.0 V at 45° C. to measure initial discharge capacity, and were then similarly charged and discharged for 50 cycles in order to measure the discharge capacity at the 50th cycle and thus evaluate capacity retention, and the results are shown in Table 2:

TABLE 2

| | Third heat-treatment temperature (° C.) | Boron coating (mol %) | Formation Charge (mAh/g) | Formation Discharge (mAh/g) | Formation Efficiency (%) | Capacity retention at 50$^{th}$ cycle (%) |
|---|---|---|---|---|---|---|
| Example 2 | 325 | 0.1 | 230.9 | 207.2 | 89.7% | 96.0% |
| Comparative Example 4 | 350 | Bare | 230.7 | 204.4 | 88.6% | 95.5% |
| Example 3 | | 0.1 | 232.5 | 207.8 | 89.4% | 95.4% |
| Example 4 | | 0.3 | 232.2 | 207.8 | 89.5% | 94.4% |

TABLE 2-continued

| | Third heat-treatment temperature (° C.) | Boron coating (mol %) | Formation | | | Capacity retention at 50$^{th}$ cycle (%) |
| --- | --- | --- | --- | --- | --- | --- |
| | | | Charge (mAh/g) | Discharge (mAh/g) | Efficiency (%) | |
| Example 5 | | 0.5 | 234.0 | 208.5 | 89.1% | 92.1% |
| Example 6 | 375 | 0.1 | 232.7 | 208.3 | 89.5% | 96.6% |

Referring to Table 2, Examples 2, 3, and 6 including boron in an amount of 0.1 mol % and heat-treated at 325° C. to 375° C. each exhibited improved discharge capacity, compared with Comparative Example 4 using the non-coated second positive active material. Example 4, coated with boron in an amount of 0.3 mol % at 350° C., exhibited excellent charge and discharge efficiency. However, the 50$^{th}$ cycle capacity retention at 45° C. tended to decrease when the boron was added in an amount of greater than 0.3 mol %, as in Example 5.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

| <Description of Some of the Symbols> | |
| --- | --- |
| 21: rechargeable lithium battery | 22: negative electrode |
| 23: positive electrode | 24: separator |
| 25: battery case | 26: cap assembly |

What is claimed is:

1. A positive active material for a rechargeable lithium battery, comprising:
   a first positive active material comprising a secondary particle comprising at least two agglomerated primary particles, where at least one part of the primary particles has a radial arrangement structure;
   a second positive active material having a monolith structure,
   wherein the first positive active material and the second positive active material each comprise a nickel-based positive active material;
   a boron-containing compound coated on only a surface of the second positive active material,
   wherein an amount of boron based on a total amount of the second positive active material is 0.3 mol % or less.

2. The positive active material of claim 1, wherein the boron-containing compound is boron oxide, lithium borate, or a combination thereof.

3. The positive active material of claim 1, wherein the boron-containing compound is $B_2O_3$, $LiBO_2$, $Li_3B_7O_{12}$, $Li_6B_4O_9$, $Li_3B_{11}O_{18}$, $Li_2B_4O_7$, $Li_3BO_3$, or a combination thereof.

4. The positive active material of claim 1, wherein the amount of boron based on the total amount of the second positive active material is about 0.01 mol % to about 0.3 mol %.

5. The positive active material of claim 1, wherein an amount of the second positive active material is about 10 wt % to about 50 wt % based on a total weight of the positive active material.

6. The positive active material of claim 1, wherein the second positive active material has an average particle diameter of about 0.05 μm to about 10 μm.

7. The positive active material of claim 1, wherein in the first positive active material,
   the secondary particle comprises a radial arrangement structure, or
   the secondary particle comprises an internal part comprising an irregular porous structure and an external part comprising the radial arrangement structure.

8. The positive active material of claim 1, wherein in the first positive active material,
   the primary particles have a plate shape, and
   a long-axis of the at least one part of the primary particles is arranged in a radial direction.

9. The positive active material of claim 1, wherein in the first positive active material, an average length of the primary particles is about 0.01 μm to about 5 μm.

10. The positive active material of claim 1, wherein in the first positive active material, an average particle diameter of the secondary particle is about 1 μm to about 20 μm.

11. The positive active material of claim 1, wherein the first positive active material is represented by Chemical Formula 1:

$$Li_a(Ni_{1-x-y-z}Co_xMn_yM_z)O_2, \text{ and} \qquad \text{Chemical Formula 1}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$0.95 \leq a \leq 1.3$, $x \leq (1-x-y-z)$, $y \leq (1-x-y-z)$, $0 < x < 1$, $0 \leq y < 1$, and $0 \leq z < 1$.

12. The positive active material of claim 1, wherein the second positive active material is represented by Chemical Formula 1:

Chemical Formula 1 wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
$0.95 \leq a \leq 1.3$, $x \leq (1-x-y-z)$, $y \leq (1-x-y-z)$, $0<x<1$, $0 \leq y<1$, and $0 \leq z<1$.

13. A method of preparing a positive active material for a rechargeable lithium battery, the method comprising:
   subjecting a first precursor to a first heat-treatment in a first oxidizing gas atmosphere to obtain a first nickel-based oxide;
   subjecting a second precursor to a second heat-treatment in a second oxidizing gas atmosphere to obtain a second nickel-based oxide having a monolith structure;
   mixing the second nickel-based oxide and a boron-containing precursor and subjecting the mixture to a third heat-treatment to obtain the second nickel-based oxide coated with a boron-containing compound; and
   mixing the first nickel-based oxide and the second nickel-based oxide coated with the boron-containing compound to obtain a positive active material comprising a first positive active material and a second positive active material having a monolith structure and coated with the boron-containing compound,
   wherein,
   the boron-containing compound is coated on only a surface of the second positive active material, and
   an amount of boron based on a total amount of the second positive active material is 0.3 mol % or less.

14. The method of claim 13, wherein the boron-containing precursor is $H_3BO_3$, $B_2O_3$, $C_6H_5B(OH)_2$, $(C_6H_5O)_3B$, $[CH_3(CH_2)_3O]_3B$, $C_{13}H_{19}BO_3$, $C_3H_9B_3O_6$, $(C_3H_7O)_3B$, or a combination thereof.

15. The method of claim 13, wherein an amount of the boron-containing precursor based on 100 parts by weight of the second nickel-based oxide is about 0.01 parts by weight to about 0.35 parts by weight.

16. The method of claim 13, wherein a temperature for the third heat-treatment for the mixture of the second nickel-based oxide and the boron-containing precursor is about 300° C. to 500° C.

17. The method of claim 13, wherein the obtaining of the second nickel-based oxide comprises pulverizing a material obtained from subjecting the second precursor to the second heat-treatment to obtain particles having a monolith structure.

18. The method of claim 13, wherein the second precursor is obtained by mixing a second composite metal hydroxide having a specific surface area of about 1 m²/g to about 30 m²/g, as measured utilizing a BET method, with a lithium-based material.

19. The method of claim 13, wherein a mixing ratio of the first nickel-based oxide and the second nickel-based oxide coated with the boron-containing compound is about 9:1 to about 5:5 based on a weight ratio.

20. A rechargeable lithium battery, comprising:
   a positive electrode comprising the positive active material of claim 1;
   a negative electrode; and
   an electrolyte between the positive electrode and the negative electrode.

* * * * *